J. WHEELWRIGHT.
Malt-Kilns.
No. 151,640. Patented June 2, 1874.
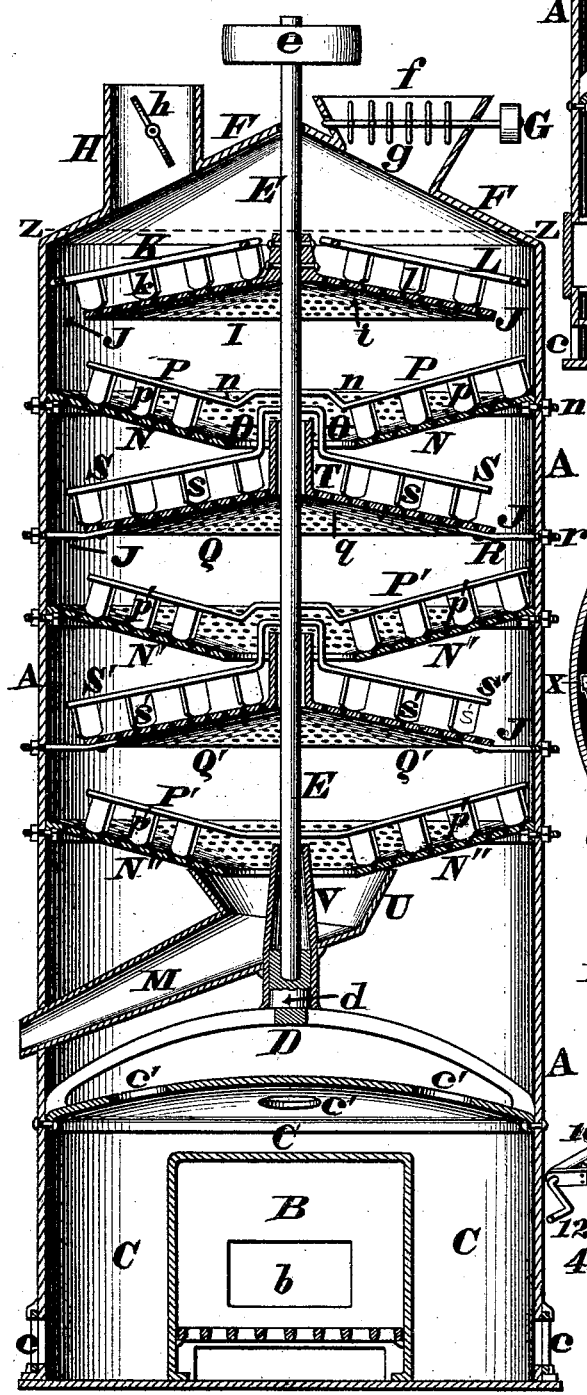
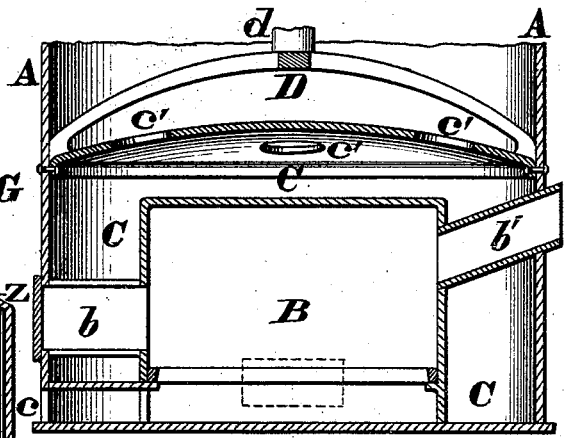
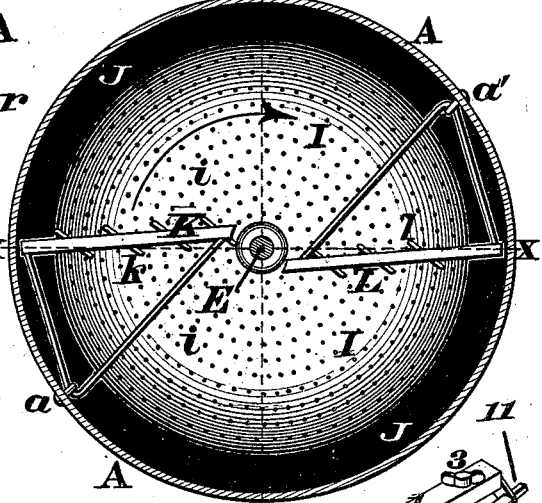
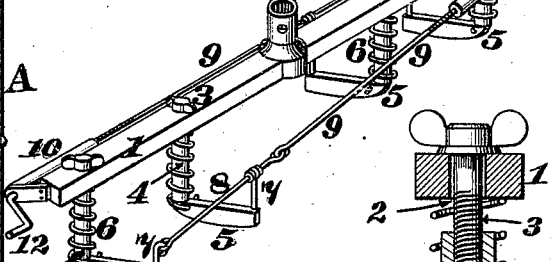
Attest:
Jas. H. Layman
H. T. Tanner
James Wheelwright
By Knight Bros, Att'ys.

UNITED STATES PATENT OFFICE.

JAMES WHEELWRIGHT, OF CINCINNATI, OHIO.

IMPROVEMENT IN MALT-KILNS.

Specification forming part of Letters Patent No. 151,640, dated June 2, 1874; application filed May 1, 1874.

*To all whom it may concern:*

Be it known that I, JAMES WHEELWRIGHT, of Cincinnati, Hamilton county, Ohio, have invented a new and useful Malt-Kiln, of which the following is a specification:

The first part of my improvements relates to a peculiarly-constructed kiln, which consists essentially of a shell or casing, within which all the operative parts are housed, said shell being composed of masonry, or else of heavy sheet metal, and being preferably of cylindrical shape. Fitted within the lower portion or base of this shell is a furnace or other heater, which discharges a current of warm air upwardly through the kiln, said current being controlled by registers, as presently explained. Occupying an axial position with reference to the shell is a vertical shaft, from which radiate at various levels sweeps or agitators that are adapted to distribute the grain over perforated floors or partitions, which are fitted within the kiln in the following manner: The uppermost of these perforated partitions, screens, or shelves, is rigidly attached to the shaft so as to rotate therewith; and this screen, instead of being level or horizontal, inclines or slopes from said central shaft downwardly toward the external shell, an annular passage being left between the margin or rim of the partition and inside of the shell, so as to allow grain to drop down upon the shelf immediately beneath. This second shelf slopes in an opposite direction, or from the shell down toward the shaft, and, unlike the upper one, it is secured to the casing so as not to be capable of rotating. The central portion of this shelf is cut away so as to allow the grain to drop through and be deposited upon the third screen, which latter is sloped in the same direction as the uppermost one. This third screen, however, is not secured to the shaft, but to the shell, and an annular passage is left between it and the casing so as to permit the grain to drop down into the fourth shelf, which is arranged in precisely the same manner as the second, and so on down, as many of these alternate outwardly and inwardly sloping shelves being employed as may be desired. As the previously-described agitators sweep over the upper surfaces of their respective shelves, it will be readily understood that the grain is compelled to traverse the kiln in a meandering or circuitous route, and being continually exposed to the ascending current of heated air the malt is dried in a rapid, thorough, and uniform manner, and without the slightest danger of burning it.

The second part of my improvements relates to a peculiar sweep or agitator, whose blades are arranged in such a manner as to be adjusted at various angles, and also capable of being pressed down upon the upper surface of the perforated shelves with any desired stress, the details of said devices being hereinafter fully described.

Figure 1 is an axial section through the kiln at the line $x\,x$. Fig. 2 is a vertical section through the heater and its accessories at the line $y\,y$. Fig. 3 is a horizontal section at the line $z\,z$. Fig. 4 is a perspective view of a modified form of agitator or stirrer; and Fig. 5 is a vertical section through one of the blades of the aforesaid stirrers.

Of the above illustrations, Figs. 4 and 5 are drawn on an enlarged scale.

A represents the outer casing or shell of the kiln, which constitutes a housing, within which the operative parts are concealed, said shell being preferably of cylindrical shape, and composed of masonry, stiff metallic plates, or other suitable materials. This shell may be of any suitable dimensions—say, from ten to sixteen feet in diameter, and from thirty to forty feet high, or even of still greater capacity, if desired. Fitted within the lower portion or base of this shell is an oven or furnace, B, having a feed-door, $b$, and a discharge-flue, $b'$, said furnace being surrounded on all sides with a chamber, C, into which cold air flows through registers $c$, and, after being warmed by contact with the heated sides and top of the oven, the air is discharged through suitable apertures, $c'$, in the roof of said chamber. Spanning the roof of this hot-air chamber is a bridge or spider, D, whose central boss, $d$, serves as a step for the vertical shaft E, which latter occupies an axial position within the cylindrical shell A, and is provided at its upper end with a pulley or gear-wheel, $e$, whereby said shaft may be rotated at any desired speed in the direction indicated by the arrow in Fig. 3. The upper portion of said shaft is journaled in the roof F of the kiln, which roof has a hopper, *f*, applied to it, through which the malt or other grain is fed into the apparatus, the feeding operation being accomplished either by hand or by an elevator, or other suitable appliances. This hopper has a shaft, G, journaled horizontally athwart it, said shaft being provided with pins or teeth, *g*, to separate any clodded or matted bunches that may have formed while the grain was on the "sprouting-floor." Attached to the roof F is a pipe, H, for discharging heated air from the kiln, the current being regulated by a register, *h*, that can be adjusted to any angle. Rigidly attached to shaft E, and at any suitable distance below the roof F, is a screen or partition, shelf, or floor, I, which is pierced with numerous perforations, *i*, said apertures being large enough to allow dust, dirt, and similar foreign substances to pass through them, while, at the same time, they prevent the escape of grain. This upper shelf I slopes from its supporting-shaft down toward the shell A, but does not come in contact with the same, an annular space, J, being left between the rim or margin of said shelf and the inter-cylindrical surface of the housing. Adapted to sweep over the upper surface of the inclined shelf I, as the shaft E is rotated, are two distinct sets of blades or sweeps, *k* and *l*, which are respectively attached to triangular frames K L, the latter being pivoted to the shell A, at *a a'*, as seen in Fig. 3. These frames are thus prevented from rotating with the shaft E, while at the same time their blades bear upon the upper surface of the shelf I with sufficient pressure to force obstructions through the apertures *i*. The blades *k l* are not located at right angles to their respective frames K L, but are placed in an oblique position thereto, and are arranged at different distances from the shaft E, in order that the entire area of the shelf I may be swept over by said blades. Located a suitable distance below the shelf I is another one, N, which is perforated at *n* and bolted to the shell at *n'*. This second shelf slopes in an opposite direction from the first one, or from the shell down toward the shaft, where it is provided with a large central aperture, O, for the discharge of grain. Adapted to sweep over the upper surface of this fixed shelf are blades *p*, attached to arms P that radiate from the central shaft E. These blades or stirrers are arranged obliquely with reference to their arms or frames, and when in motion they cause the grain to be distributed over the surface of shelf N, and to be discharged in a gradual and uniform flow down through the opening O onto the third shelf Q. This shelf slopes in the same direction as the upper one, I, but instead of rotating with the shaft E it is secured to the shell by stays R and nuts *r*. The shelf Q is perforated at *q*, and is swept by blades *s*, that are secured obliquely to arms S, the latter being attached to shaft E. The central or elevated portion of this last-described shelf has a cylindrical neck or collar, T, through which the shaft E passes, and said neck projects up through the central opening O of the second screen M. This neck is carried up some distance above the depressed portion of floor N, in order that the grain, as it escapes through opening O, may not come in contact with the rotating shaft, and thereby become bruised, and also tend to clog up the apparatus. J is an annular passage between the margin of shelf Q and interior of the shell. Located below the third shelf Q are as many other shelves as may be desired, the arrangement of the same being identical with the ones just described—that is to say, having an alternate inward and outward slope—the outwardly-sloping ones being provided with necks and annular passages, while the inwardly-sloping ones are furnished with central discharge-openings. N' N'' represent two more of the inwardly-sloping shelves, and Q' one more of the outwardly-sloping screens, said shelves being swept respectively with blades *p'* and *s'* secured to arms P' and S'. J are the annular passages, T the necks, and O the central openings, of these last-mentioned shelves. Placed beneath the lowermost shelf N'' is a hopper, U, which receives grain through the opening O and discharges it outside of the kiln by means of a delivery-spout, M. V is a collar or guard, which prevents grain entering the step *d*.

Windows may be inserted on opposite sides of the shell to admit light to the interior of the apparatus, thereby enabling the attendant to inspect the kiln and see if all the operative parts are performing their appropriate duties.

As previously described, the blades or stirrers are represented as rigidly attached to their arms; but it is evident that they may be secured in a yielding and adjustable manner, as shown in Fig. 4.

In this illustration, 1 represents an arm or rake-head to be attached to the rotating shaft of the kiln, and this head is perforated for the reception of screws 3, which engage with the hollow stems 4 of sweeps or blades 5, said stems being surrounded with springs 6. The stress of these springs has a tendency to separate the blades from the head—but this can be accomplished only as the screws will permit—and it is evident that, by properly rotating said screws, the position of the blades with reference to the rake-head will be varied accordingly.

The object of thus adjusting the blades is to insure them fitting down snugly upon the upper surface of the shelves, so as to force all obstructions through the apertures of the same, while at the same time they can yield vertically in case of contact with larger impediments. This yielding of the blades also prevents them bruising the malt or other grain. In order that the blades may be adjusted and maintained in any desired oblique position with reference to the arm 1, their rear ends are provided with studs 7 terminating at top in eyes for the reception of a connecting-link, 8, to which is attached one end of a rod, 9, whose other end is screw-threaded, and engages with a rotary nut, 10, having a non-circular head, 11, or a crank or other device, 12, wherewith said nut can be turned in either direction, as may be desired. It is evident that, by simply rotating the nut 10, the blades can be adjusted as desired, and after once being set they will maintain a position parallel with each other until again changed by the attendant. These operating devices can be applied to each side of the rake-head, so as to adjust both of the oppositely-acting sets of blades. The adjusting-screws may be operated by hand, or else with a spanner or wrench.

The operation of my kiln is as follows: Malt or other grain to be dried is first conducted into the hopper $f$ at the top of the kiln, where it is subjected to the action of wallower G $g$, which separates any matted or clodded bunches, and the now loosened and separated grain falls down directly upon the upper screen or shelf I, which revolves slowly in the direction indicated by the arrow in Fig. 3. The sweeps or blades $k$ and $l$ cause the grain to be distributed thinly and evenly over the upper surface of said screen, and this spreading and distributing action of said blades forces all dust, dirt, and other foreign substances through the apertures $i$, while the inclination of the screen sheds the grain outwardly toward the shell A. The grain accordingly falls down through the annular passage J, and is received upon the second screen N, whose inclination causes the grain to slide toward the shaft E from all sides of said screen. A too rapid descent of the grain is prevented by the blades $p$, whose oblique surfaces sweep the grain around upon the screen in a spiral manner, and thereby conduct it to the central opening O very gradually, so as to insure all foreign substances being forced through the perforations $n$. As the grain is thus gradually delivered through the central opening O, it falls upon the elevated portion of the third partition or shelf Q, where it is subjected to the same treatment as upon the upper screen, I—that is to say, the grain is shed outwardly to the annular passage J, and then falls upon the fourth shelf N′, and so on, traversing the kiln in the above-described alternate outward and inward flow until it is finally discharged into the delivery-spout U M, and conducted away from the apparatus. During the entire time occupied by the grain in traversing the kiln in this gradual and circuitous descent it is opposed by the ascending current of warm air, which continually rises from the heater C $c'$ $c'$ and, circulating through the entire apparatus, escapes at the register H $h$. The grain being continually agitated, and constantly exposed to this current of heated air, the result is that all moisture contained in it is thereby evaporated in the most thorough and rapid manner. The temperature of the air prevents the possibility of burning, or otherwise injuring, the grain.

As the furnace B can be arranged to consume any kind of fuel, or even the spent materials of the kiln, it will be seen that it is a much more economical apparatus than the ordinary ones, which are compelled to burn charcoal, coke, or other expensive fuel, which are sometimes difficult to obtain.

My apparatus enables maltsters to dispense with an attendant at the top of the kiln, thus diminishing the expense of drying the grain and avoiding the necessity of exposing a man to the noxious gases that are continually emitted during the drying operation.

Where there is but a limited amount of room in which to build the kiln, the furnace may be located at either side of the shell, or else at a remote distance from the same, in either of which cases the warm air should be conducted into the interior of the apparatus by suitable pipes.

A greater or less number of screens may be used than is represented in the drawings, and they may be inclined at any suitable angle.

The screens can be made in sections, so as to be readily removed through the windows W, either for inspection or repair.

I claim as my invention—

1. In a kiln for drying malt or other substances, the casing A, having alternately outwardly and inwardly sloping perforated screens L N, and the shaft E, with its fixed screen, in combination with the heater B C, arranged for use in the manner and for the purpose described.

2. The combination of the receiving-screen, the alternately outwardly and inwardly sloping shelves, as shown, and the series of rotary rakes, operating in the manner described.

3. The combination of the receiving-screen, the alternately outwardly and inwardly sloping shelves, as shown, the series of rotating rakes, and the wallower G $g$, substantially as described, and for the purpose set forth.

4. The combination of the perforated rake-heads 1 2, temper-screws 3, stems 4, blades 5, springs 6, and regulating devices 8 9 10, substantially as and for the purposes set forth.

In testimony of which invention I hereunto set my hand.

JAS. WHEELWRIGHT.

Attest:
 GEO. H. KNIGHT,
 JAMES H. LAYMAN.